US007581183B2

(12) United States Patent
Pfahlmann (10) Patent No.: US 7,581,183 B2
(45) Date of Patent: Aug. 25, 2009

(54) METHOD FOR GRAPHICAL PRESENTATION OF OBJECTS AND TECHNICAL PROCESSES ON A SCREEN AND COMPUTER PROGRAM PRODUCT USED FOR THIS PURPOSE

(75) Inventor: Lothar Pfahlmann, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 509 days.

(21) Appl. No.: 11/152,878

(22) Filed: Jun. 15, 2005

(65) Prior Publication Data
US 2005/0278638 A1 Dec. 15, 2005

(30) Foreign Application Priority Data
Jun. 15, 2004 (DE) .................... 10 2004 028 792

(51) Int. Cl.
*G06F 3/00* (2006.01)
*G06F 3/048* (2006.01)
(52) U.S. Cl. .................... 715/713; 715/841; 715/850
(58) Field of Classification Search .......... 715/713, 715/810, 817–819, 828, 829, 841, 845, 848, 715/850
See application file for complete search history.

(56) References Cited
U.S. PATENT DOCUMENTS
5,995,101 A 11/1999 Clark et al.

6,636,250 B1 * 10/2003 Gasser ...................... 715/853
2002/0075325 A1 * 6/2002 Allor et al. ................. 345/853
2004/0237027 A1 * 11/2004 Wakita et al. .............. 715/500

FOREIGN PATENT DOCUMENTS
DE 197 40 974 A1 3/1999
EP 1 241 568 B1 5/2004

OTHER PUBLICATIONS
Jürgen Burberg, Windows 3.1, Vieweg 1992, pp. 129-130.

* cited by examiner

*Primary Examiner*—Weilun Lo
*Assistant Examiner*—Truc T Chuong (57) ABSTRACT

The invention relates to a method for graphical presentation of objects and/or technical processes on a screen as well as to a system for implementing the method. In some cases different views may be frequently selected, and these views may be presented in different display windows. To edit the totality of views or subsequently look at them, a frequent change of view may be required. Such changes of view may be cumbersome and tedious and take time. To resolve this problem, the display area (3) is equipped with a least one element, (4) which can be activated by an input device (5). Activating the element (4) expands or contracts the contents of the display area (3) by a graphical object (6). In this way a frequent change of view is avoided, which provides ergonomic benefits to a user working with the graphics.

17 Claims, 8 Drawing Sheets

METHOD FOR GRAPHICAL PRESENTATION OF OBJECTS AND TECHNICAL PROCESSES ON A SCREEN AND COMPUTER PROGRAM PRODUCT USED FOR THIS PURPOSE

CROSS REFERENCE TO RELATED APPLICATIONS

This application claims priority to the German application No. 10 2004 028 792.9, filed Jun. 15, 2004 and which is incorporated by reference herein in its entirety.

FIELD OF INVENTION

The invention relates in general to the presentation of screen contents by a computer and to display programs suitable for this purpose. In particular the invention relates to the graphical presentation of objects or technical processes by graphical editors.

SUMMARY OF THE INVENTION

Technical processes or technical objects are mostly presented in the form of technical drawings, flowcharts and so forth. To take account of the three-dimensionality of the objects or to present the given processes comprehensively, a number of presentations are selected as a rule. Different views are frequently selected for objects, for example a perspective view, a side view, or a view of the object from above or prepared sections along predetermined lines. With processes, which means working or manufacturing procedures, presentations at a number of levels of abstraction are mostly required. Thus a first presentation can be selected to display the entire process, for example in the form of a flowchart. A second presentation can represent a subprocess, which for example is an individual processing step in the overall process, and which corresponds to one element in the flowchart.

Since the screen area is limited it is mostly necessary to switch between these views when creating the different presentations. In this case graphical editors are used with which different views can be shown in resizable windows. Selecting the corresponding entries in drop-down menus of the relevant editor selects the views, moves windows into the foreground and sets their size.

Figure 2:
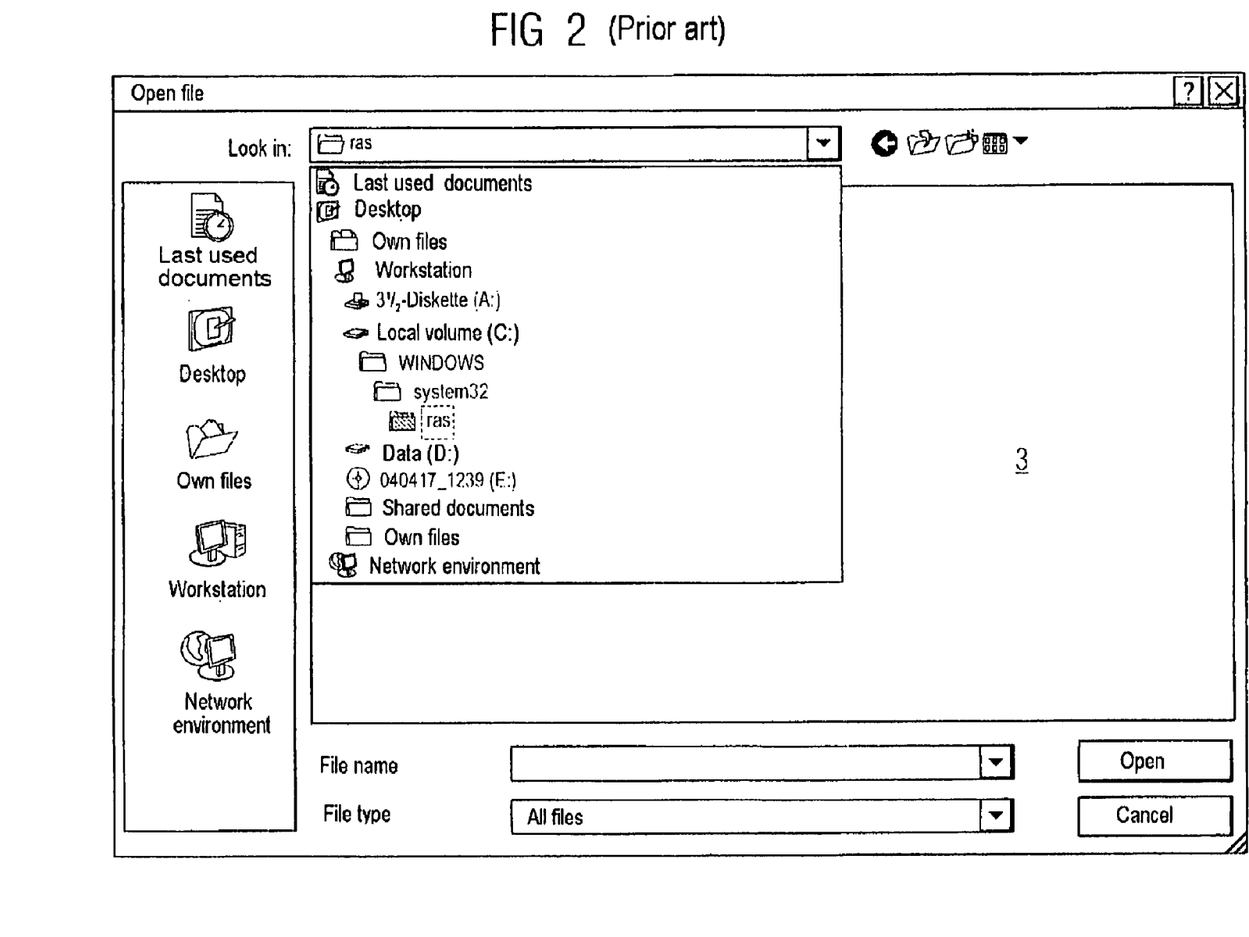
FIG. 2 shows a tree control in accordance with the prior art.

Tree controls are generally known for structured display of contiguous test information. With a tree control text information is arranged in a hierarchical tree-type list. The entries in the tree control can for example be names of files and folders on a computer hard disk. If the tree control is displayed in a display area, for example a display window in a graphical user interface, and if a folder symbol is clicked on with a mouse pointer, a list of the graphical objects is displayed, generally offset slightly to one side. Each graphical object represents a file which is stored in the folder. This is illustrated in FIG. 2. Display area 3 appears in the Windows XP operating system if a file is searched for at operating system level. Clicking on the line "local disk (C:)" displays an additional graphical object in the form of a folder symbol with the designation "Windows". The content arranged below the line "local disk (C:)" as from the line designated "local disk (D:)" is shifted downwards in this case. The same applies when a folder symbol labeled "system32", or the folder labeled own is clicked on.

The underlying object of the invention is to allow an ergonomic viewing of technical objects or technical processes with a number of representations on one screen.

This technical problem is resolved by the features of the independent claims. Advantageous developments are reproduced by the features of the dependent claims or can be taken from the description in conjunction with the Figures.

The invention has recognized that the above problem can be resolved by the display area having an element that can be activated by at least one input device, and that the content of the display area is expanded by a graphical element when the element is activated.

With graphical user interfaces such as Apple Macintosh® or Microsoft Windows® for example, programs use display areas to interact with the user. These display areas are frequently display windows for which the contents can be viewed by scrolling from top to bottom with the aid of an input device. These types of display window are for example widely used by graphical editors to represent technical processes or to fix objects in different views.

In the sense of the present invention this type of display area has at least one activatable element. This is a subsection of the display area or an area element which can be selected by the user by means of an input device. A computer mouse, a trackball, a light pointer, a joystick, a graphics tablet or similar can be used as an input device to select the element. The element can be selected for example by the user moving the computer mouse to place the pointer on the element and then clicking on it to activate it.

Once the element is activated, the display area does not change as such, meaning that its external dimensions and other attributes remain the same. Nor is any further display area added to it. Activating the element merely changes the graphically displayed content of the display area. The content is supplemented by means of the graphical object.

Supplementing the contents of the display area is generally represented by the display area and the graphic object having the same object and/or the same process as their content.

If for example the display area represents an object, activating the element can provide a further presentation in another perspective. Thus the display area can initially show the object in a perspective view whereas the graphical object shows the same object in a view from above or in some other way. It is also possible, while retaining the perspective, to use the graphical object to merely show details of the object or for the object or parts of the object to be viewed using a reduced scale. Of course it is also possible for these two measures to be combined, for example by the graphical object being used to show details of the same object from a different perspective compared to the display area.

If a technical process, for example a manufacturing or a work procedure is illustrated by the display area, the graphical object can be used to illuminate and graphically display another abstraction level of the process. This other abstraction level can for example show details of one or more process steps of the overall process shown on the display area. The graphical object can also show one or more steps of the overall method in greater detail or can display stored additional information. In the latter case for example the process time required for the relevant step can be displayed in order to optimize the overall process from a timing standpoint.

The above embodiments make it plausible for a display window supplemented by an activatable element to avoid the changes between different views of the object or of the technical process respectively with the aid of a number of display areas or display windows, or at least for such changes to be restricted. There is the added benefit that fetching further graphical information using one or more graphical objects is particularly simple here and is done particularly quickly. The contents of a number of technically-related representations is assembled and the elements linked to one another with the aid of a number of activatable elements. This makes handling of graphical information simpler, increases operating convenience and reduces the likelihood of making mistakes.

Just as the contents of the display area were supplemented by activating the element, it is conversely also possible, by renewed activation of the element, to remove the graphical object or the supplemented contents. Just a simple mouse click is sufficient to quickly remove information not required at present.

Preferably the graphical object or its contents is just as easy to edit or to modify as the remaining contents of the display area. If the graphical object is modified by the user and is hidden by the user clicking on the element assigned to the graphical object, this hiding is generally accompanied by storage of the graphical contents. If this said element is activated again later then in future the contents of the display area can be supplemented with the modified graphical object.

If the contents of the display area are supplemented with the graphical object this produces the practical problem of how and where the graphical object is to be positioned. To supply additional information it should not overlay or cover the existing available contents but should be arranged such that the components of the object all of the technical method respectively already displayed remain unchanged.

To achieve this objective The graphical of checked his initially positioned in the immediate vicinity of the activated element. If this is sufficient space there the positioning of the graphical element does not present any problem. If however the graphical object would overlay a part of the previous contents of the display area the procedure is for the positioning of the graphical object within the displays there bits to displace its previous contents as from the required position of the graphical object in a downwards direction. The inserted a graphical object is thus positioned in a type of tree control.

The method according to the invention is excellently suited to illustrating technical processes, and he here especially for illustrating at the functional, organizational and/or chronological sequence of a manufacturing or working process.

The practical execution of the program is best undertaken using a graphical editor, that is a computer program which can run on a standard PC. The computer program here is loaded directly into the internal memory, for example the RAM of the digital computer and includes in its source code sections or comprises software codes sections with which the method can be executed when the program runs on said computer. The computer program, can, as is the normal case be stored in a computer memory be embodied on a data medium of be transmitted by means of an electric carrier signal. The transmission can be within a computer network in this case, for example in a LAN (local area network), in a WAN wide area network), or in the Internet.

The present method as well as the associated editor will be explained in greater detail below on the basis of exemplary embodiments with reference to the drawings.

DETAILED DESCRIPTION OF THE INVENTION

Figure 1:
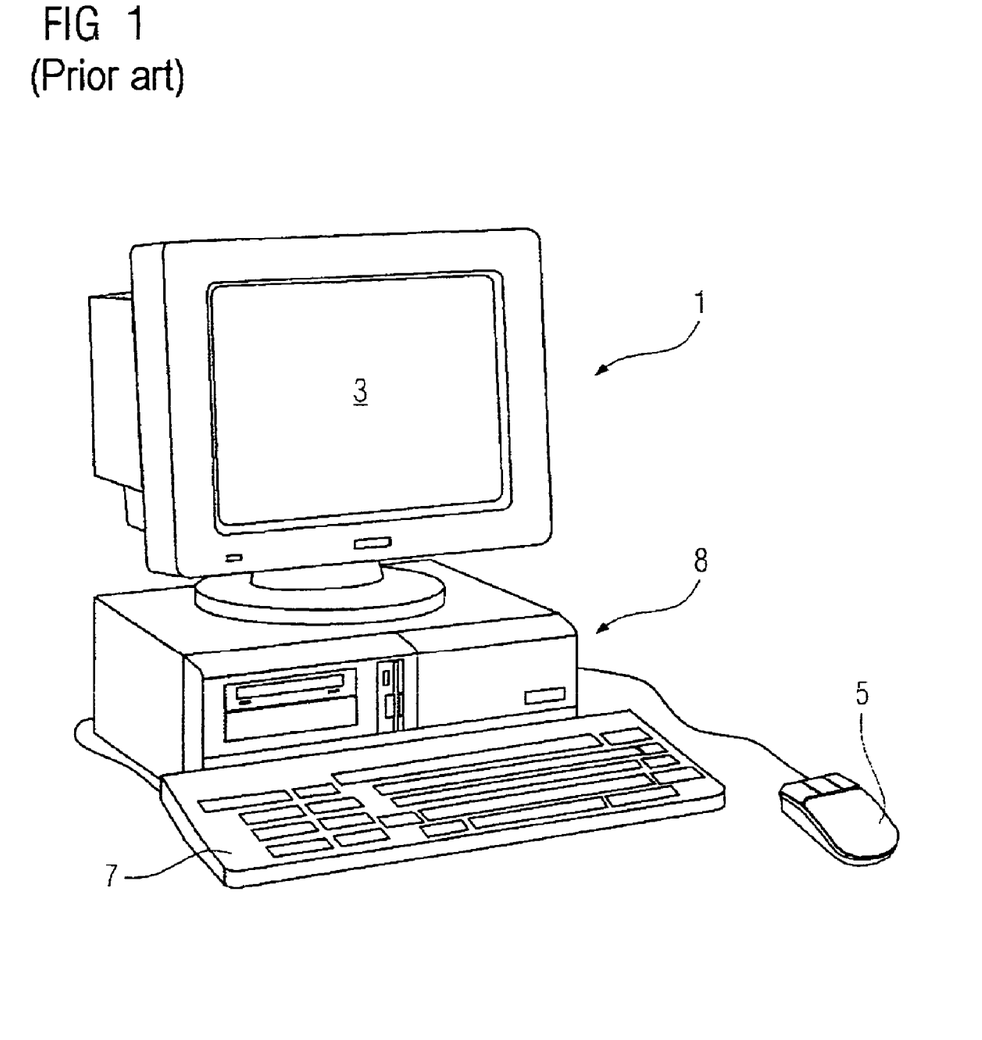
FIG. 1 shows a workstation for using the graphical editor according to the prior art.

FIG. 1 shows the area of application of the present invention, namely the presentation in a perspective view of screen contents by a computer 8. The computer 8 has a mouse 5 and transfers data to be presented to a screen 1. The screen 1 presents the data in one or more display windows 3.

Figure 3:
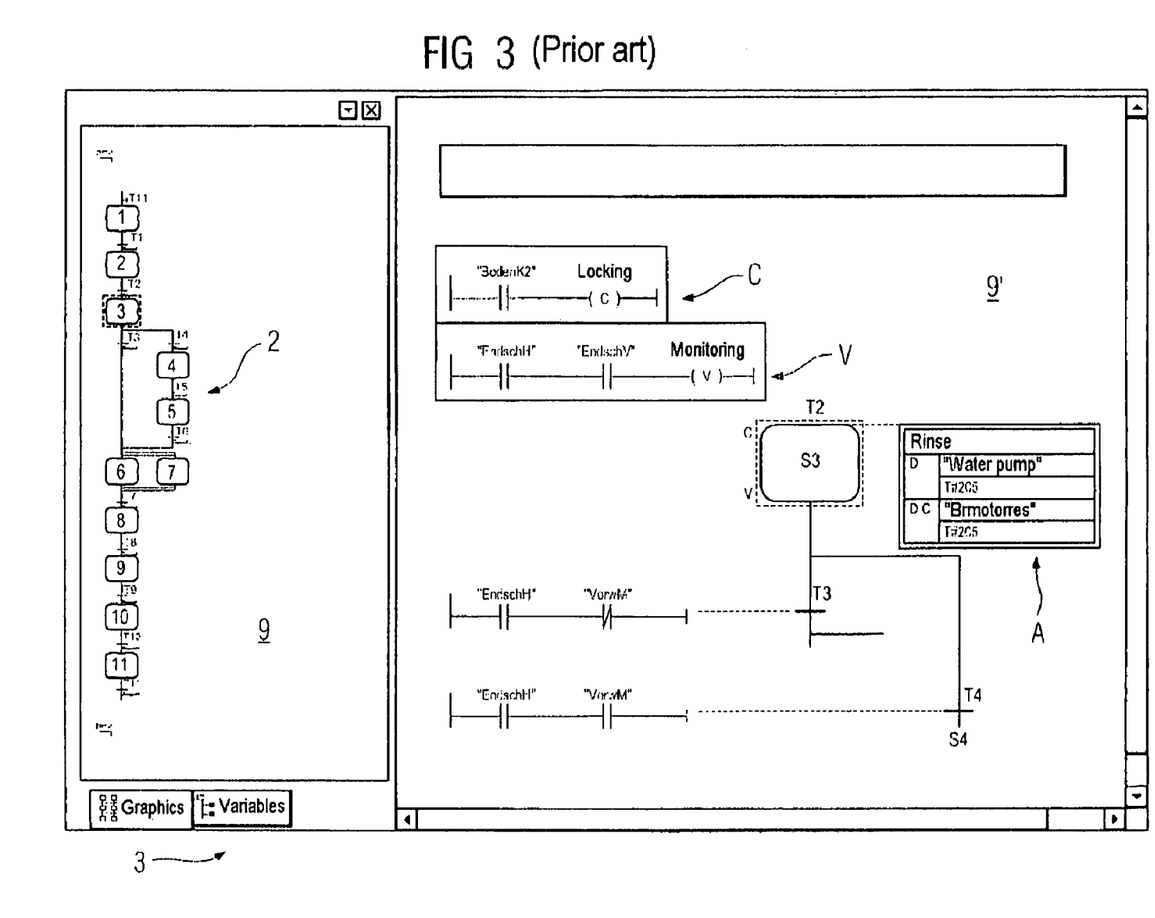
FIG. 3 shows display areas of a graphical editor in accordance with the prior art.

FIG. 3 shows a display window 3 according to the prior art. In this case this is a window 3 of the graphical editor S7GRAPH which is marketed commercially by the applicant of the present invention and which runs under the Microsoft Windows® operating system.

The display window 3 is divided into two The left-hand window contents 9 show a first representation of a work process in an overview diagram. Process steps 1 to 11 are arranged in the form of a chain below one another and are shown partly displaced sideways. The process steps represent stations S1, S2, . . . S11 in a carwash lane. These stations are S1 (entry into the carwash system), S2 (start of auto wash), S3 (rinse), S4 (prewash), S5 (back), S6 (main wash), S7 (underbody wash), and S8 (final rinse), S9 (drying) S10 and S11. The right-hand window contents 9' show the same work process in a second representation but shows details of step S3 which will be described in even greater detail by the next diagram.

To uniquely identify the position of the vehicle within the carwash lane, but also to determine the status of system components, there are sensors between the vehicle stations in the carwash lane that can be interrogated. With the aid of these sensors it is possible to find out whether particular conditions, referred to here as transition contents T1, T2 . . . are fulfilled. For example such transition contents can be used to find out whether a vehicle has driven into the carwash. Another transition content would be whether a wash brush had been moved into its required position or whether an underbody wash had been started.

Furthermore there are one or more locking conditions C relating to each station. It is thus possible to find out whether a protective device has been activated or locked so that the associated locking condition is either fulfilled or is not. For example it is possible to inquire whether a protective grid has been moved into its required position or whether an emergency switch has been pressed.

Furthermore there are monitoring conditions V, with the aid of which different monitoring actions can be programmed, for example maximum monitoring or delay times for the relevant steps.

Furthermore there are programmable actions A which are for example assigned to a procedural step. Thus by setting a suitable bit in the hardware control device of the car wash the action can be defined that a fan operates for a predetermined time, that a pump cuts in for a predetermined time etc.

For the graphical presentation of the sequence of washing a vehicle in the carwash the monitoring conditions V and the locking conditions C and the actions A are of particular interest. If for example an error search is to find out why station S3 is no longer operating correctly, as well as the overview presentation shown in window 9, the detailed information for the monitoring conditions V, the locking conditions C as well as the actions A is also required.

It can be seen from FIG. 3 that in accordance with the prior art, if the contents stored for an operating step S1, S2, . . . , namely the transition contents T, the locking conditions C, the monitoring conditions V, and the actions A are shown separately in one or more single leaf representations 9' in accordance with the right-hand half of the display area 3, and there is additional the overall display 9 in the left-hand half of the display area. For the given case of searching for errors additional views are thus required. In window half 9' of FIG. 3 for example the locking conditions C, the monitoring conditions V, and the actions A for step S3 are also noted. These contents are fixed. To have other contents displayed in the window, it is necessary to go through the tedious process of defining these contents by clicking on drop-down menus of the editor in order to subsequently have the contents displayed.

In other cases four or even more windows are needed which quickly renders the handling difficult to follow.

FIGS. 4 to 8 show the procedure according to the inventive method or the graphical editor used for this process. S7GRAPH is again used as an editor here, but in modified form.

Figure 4:
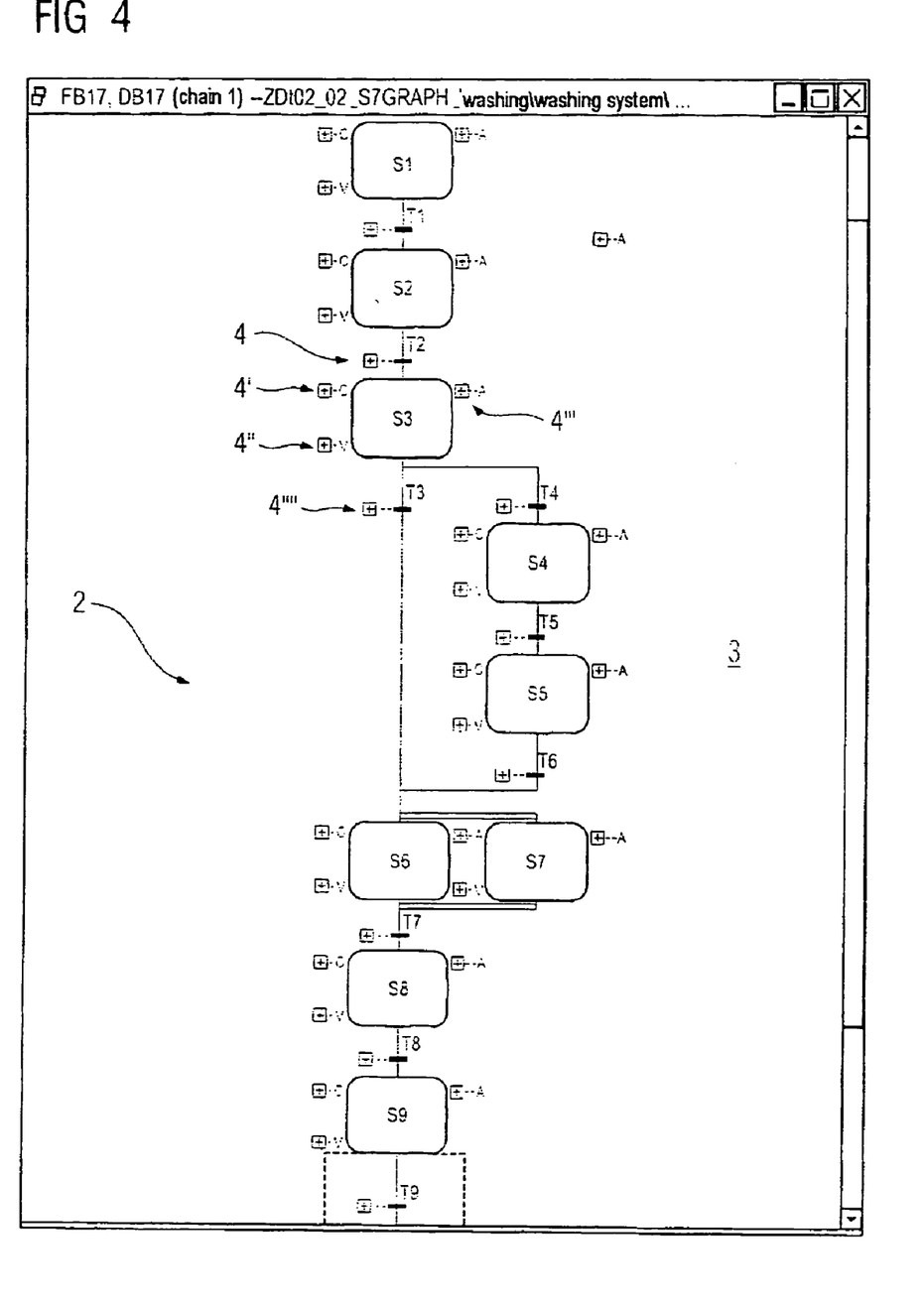
FIGS. 4 to 8 show display areas of the graphical editor in accordance with the exemplary embodiment of the present invention.

FIG. 4 here initially shows the overview presentation of the same process 2 as in FIG. 3, that is comparable with the left-hand window contents 9 in FIG. 3. By contrast with window half 9 of FIG. 3, the symbols for the individual stations are S1, S2 to S9, which correspond to the stations 2 to 9 in FIG. 3. The symbols S1 to S9 are supplemented by activatable elements 4, 4', 4'' and 4'''. The activatable element 4 is a small rectangle within which there is a plus sign. The plus sign is designed to indicate that by clicking on this element of the display area 3 a graphical object 6 can be inserted. Element 4' is a small rectangle within which there is a minus sign. The minus sign is designed to indicate that by clicking on this element a graphical object 3 can be removed from the display area 6. A transition condition T is interrogated with activatable element 4, with element 4' a locking condition, with element 4'' a monitoring condition V, and with element 4''' an action A.

Figure 5:
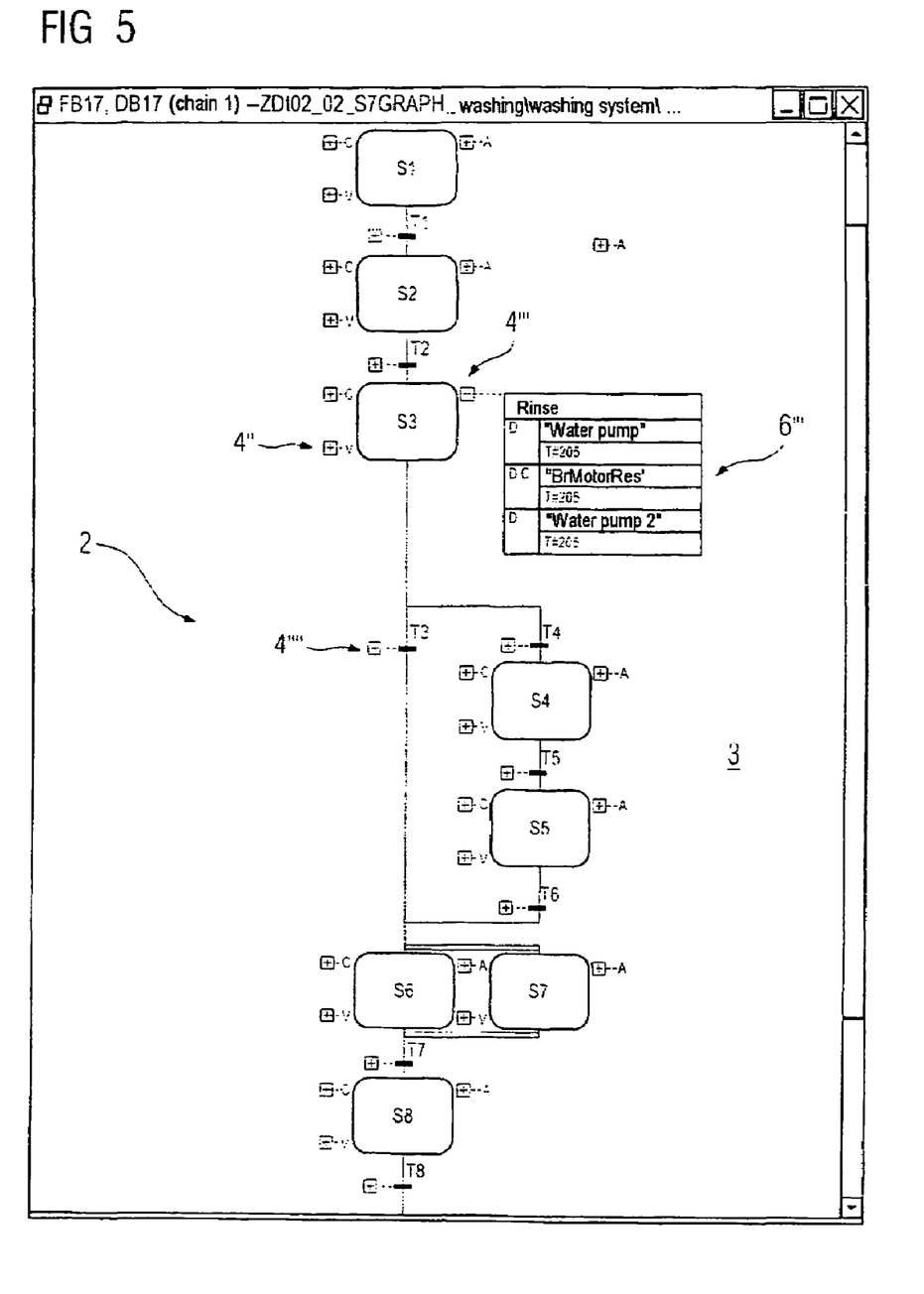

Clicking with the mouse pointer on element 4''' activates this element, and this produces FIG. 5 with the graphical object 6''' corresponding to activatable element 4'''. Since the graphical object 6''' would have partly covered symbol "S4" had no further action been taken, all window contents below S3 are shifted downwards. This can be seen from the fact that the space between the symbols "S3" and "T3" has become greater.

Figure 6:
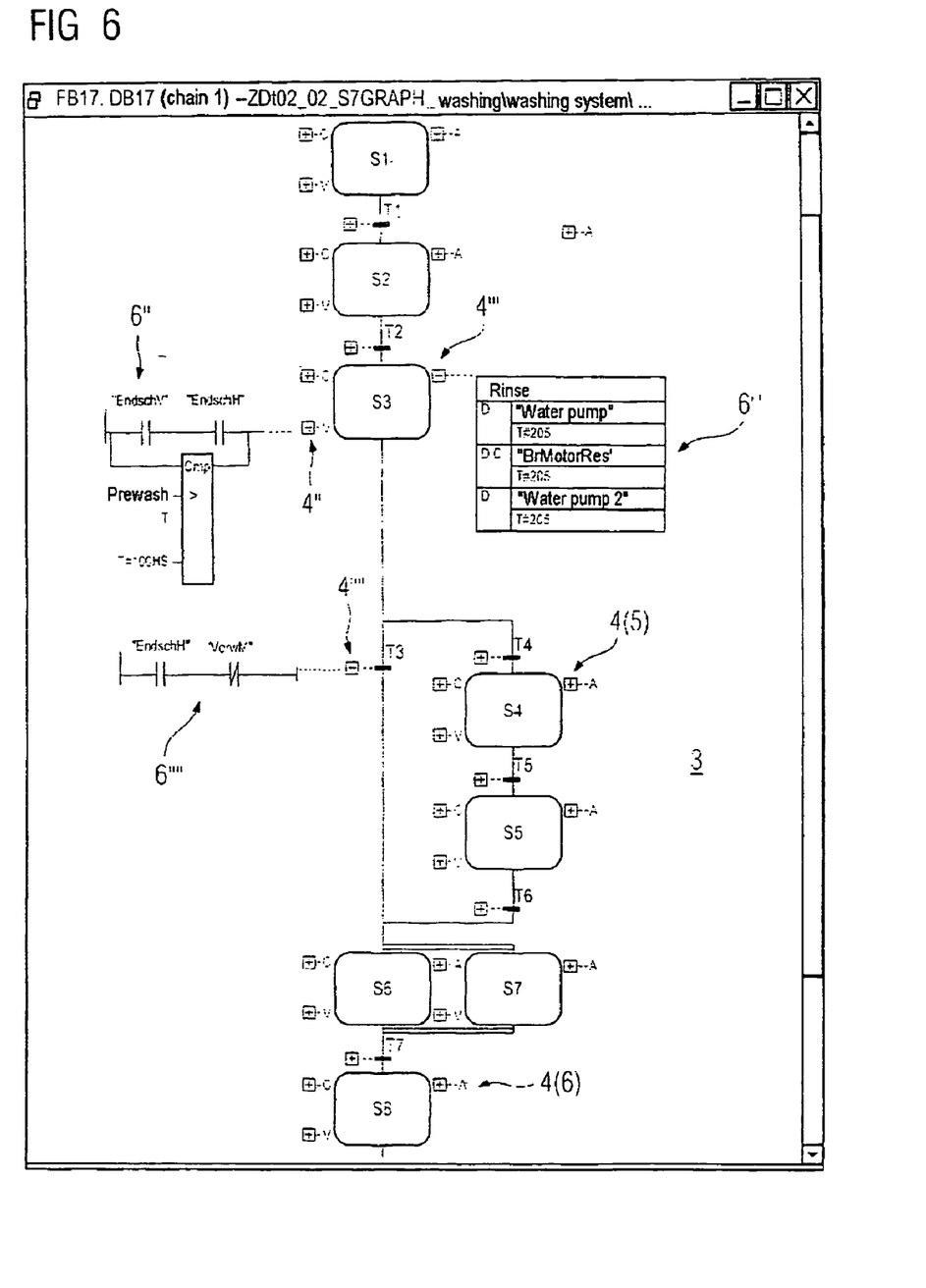

Clicking subsequently with the mouse on the activatable element 4'',and also on the element located on the left next to the symbol "T3" produces FIG. 6. There are two further graphical objects 6'' and 6'''' included here which in conjunction with the graphical object 6''' supplement the original window contents of FIG. 4. It is the contents which is supplemented here, i.e. there is a further single window containing modified contents.

If the user decides that at least one of the graphical objects 6'', 6''' and 6'''' is no longer needed he can hide the object by simply clicking on the associated activatable element 4'', 4''' or 4'''' in each case. This option is expressed on the display area 3 in that the relevant element no longer has a minus sign within it.

Clicking subsequently on activatable elements $4^{(5)}$ and $4^{(6)}$, includes the graphical objects $6^{(5)}$ and $6^{(6)}$ and produces FIG. 7. Since there was enough space for placing the graphical objects $6^{(5)}$ and $6^{(6)}$ in FIG. 6 it was not necessary to displace any window contents downwards to position these objects.

Figure 7:
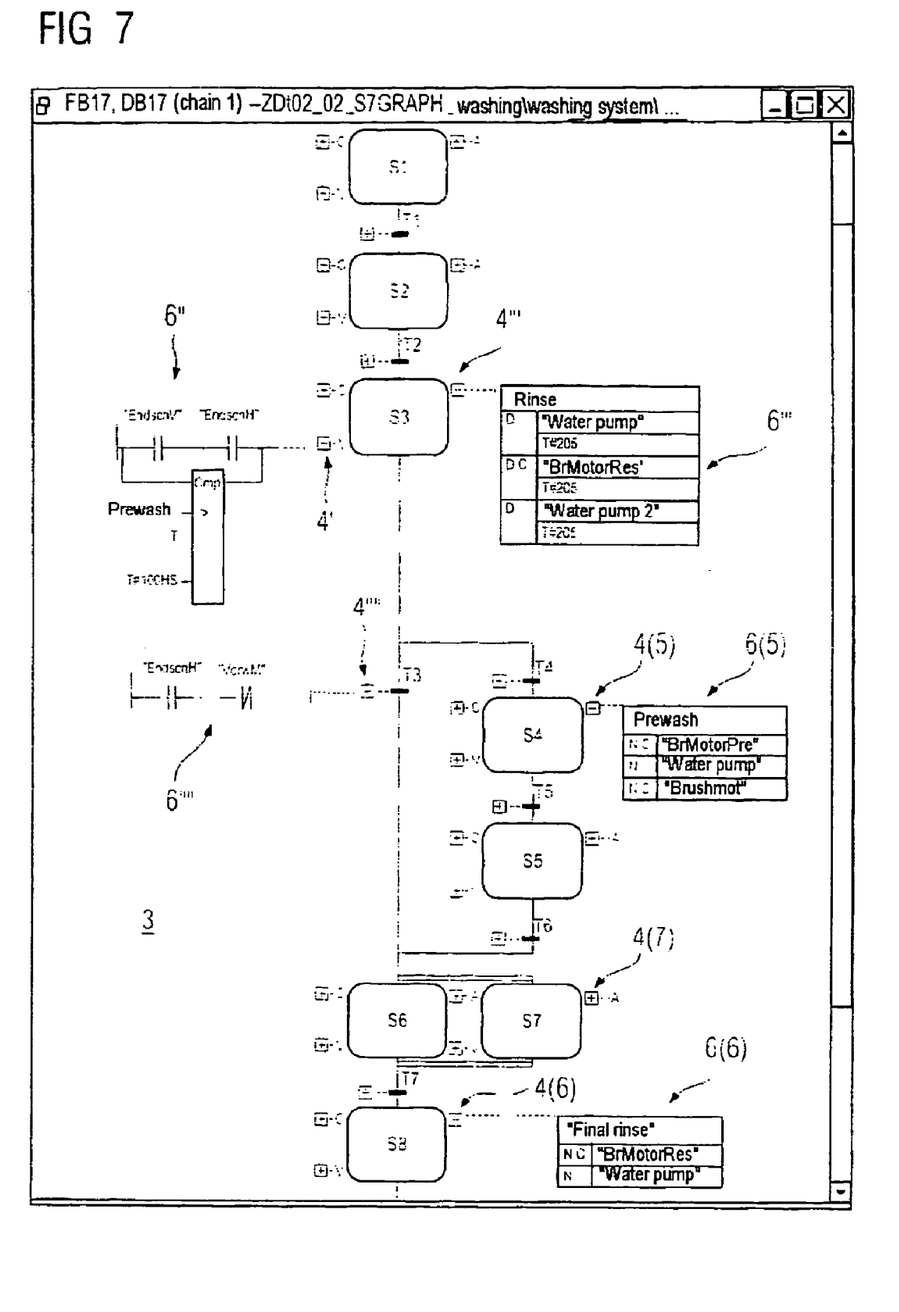
Figure 8:
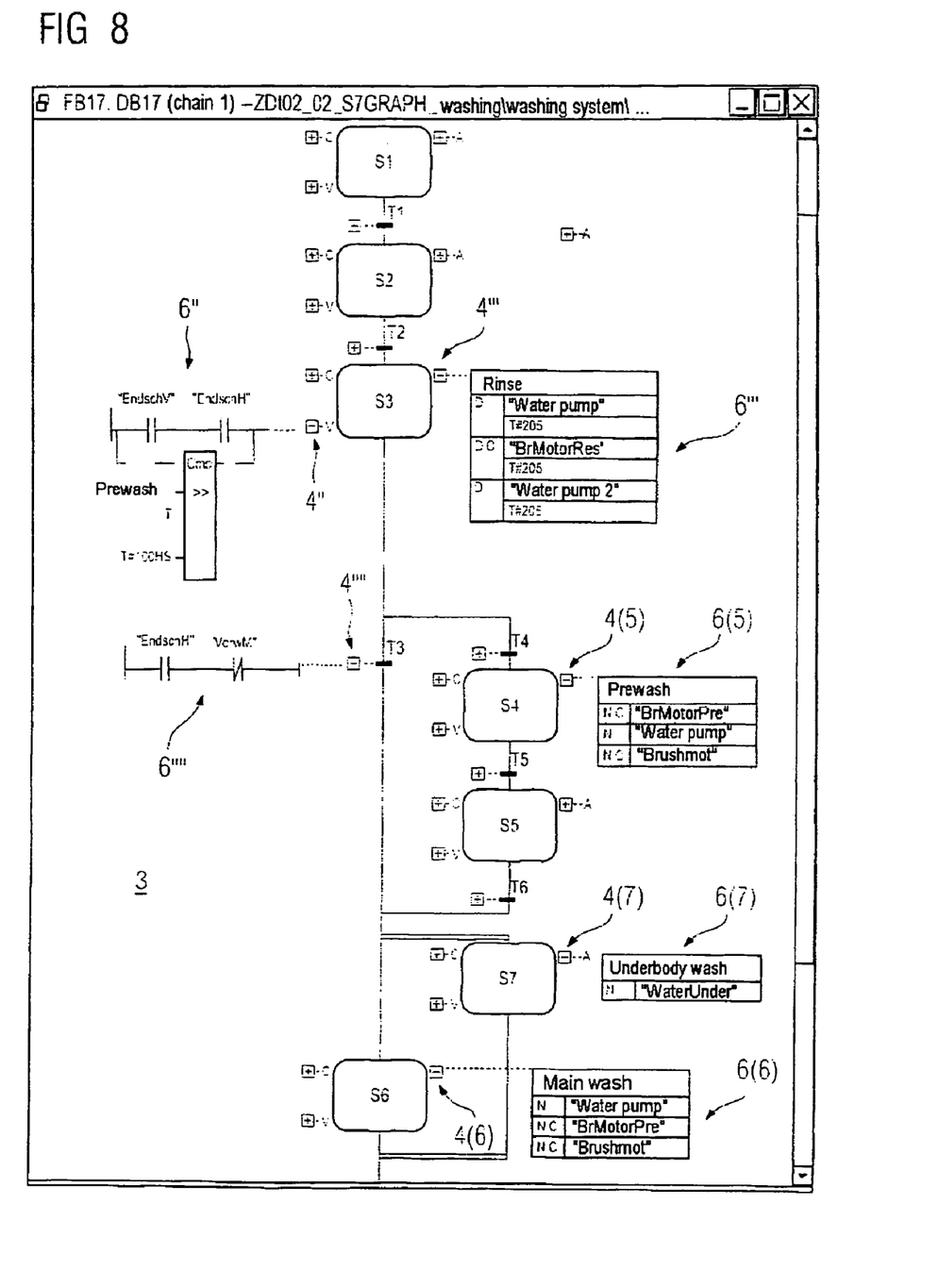

Clicking in FIG. 7 on the activatable element $4^{(7)}$ inserts the graphical object $6^{(7)}$ and produces FIG. 8. Since there was no free space to position graphical object $6^{(7)}$ in FIG. 7 positioning the graphical object $6^{(7)}$ shifts part of the window 7 downwards from symbol "S6". By scrolling the window contents the part of the window located further down can be inspected.

The present embodiments show that by simply clicking with the mouse on the activatable elements of the display 3 graphical contents can be inserted or removed from this element. This procedure allows flexible configuration of the desired window content according to individual user wishes and helps to ensure a better overview of the available information.

The invention claimed is:

1. A method for graphical presentation of a three-dimensional physical object and/or a technical process on a screen, wherein an image of the object and/or the process are presented on a display area of the screen, the method comprising:
providing at least one element on the display area, wherein the element can be activated by an input device, said at least one element being associated with the following: a view of a portion of the graphical presentation of the object, a first two-dimensional visualization view of the three-dimensional physical object along a first spatial direction, and a flow diagram of the technical process; and
adding a graphical object to the display area when activating the element, wherein the graphical object displays the following proximate said at least one element: an augmented graphical view of the portion of the object, a second two-dimensional visualization view of the three-dimensional physical object, wherein the second visualization view of the rotation of the three-dimensional physical object relative to the first visualization view of the object, wherein the second visualization view of the three-dimensional object is along a second spatial direction perpendicular to the first spatial direction, and one or more actions in connection with the flow diagram of the technical process,
wherein the adding of the graphical object to the display area is performed such that with the positioning of the graphical object within the display area its previous contents is shifted downwards as from the required position of the graphical object should the graphical object overlay a part of the previous contents of the display area.

2. The method according to claim 1, wherein the display area and the graphical object contain the same object and/or the same process.

3. The method according to claim 2, wherein the element is activated by clicking on it with a computer mouse and that clicking on the element again with the mouse hides the graphical object.

4. The method according to claim 2, wherein the graphical object is modified by a user, after clicking again on the element the graphical object disappears and in the future the content of the display area can be supplemented by clicking on the element with the modified graphical object.

5. The method according to claim 2, wherein the adding of the graphical object to the display area is performed such that with the positioning of the graphical object within the display area its previous contents is shifted downwards as from the required position of the graphical object should the graphical object overlay a part of the previous contents of the display area.

6. The method according to claim 2, wherein the functional, organizational and/or chronological sequence of a manufacturing or work process is represented.

7. The method according to claim 1, wherein the element is activated by clicking on it with a computer mouse and that clicking on the element again with the mouse hides the graphical object.

8. The method according to claim 7, wherein the graphical object is modified by a user, after clicking again on the element the graphical object disappears and in the future the content of the display area can be supplemented by clicking on the element with the modified graphical object.

9. The method according to claim 7, wherein the adding of the graphical object to the display area is performed such that with the positioning of the graphical object within the display area its previous contents is shifted downwards as from the required position of the graphical object should the graphical object overlay a part of the previous contents of the display area.

10. The method according to claim 1, wherein the graphical object is modified by a user, after clicking again on the element the graphical object disappears and in the future the content of the display area can be supplemented by clicking on the element with the modified graphical object.

11. The method according to claim 10, wherein the adding of the graphical object to the display area is performed such that with the positioning of the graphical object within the display area its previous contents is shifted downwards as from the required position of the graphical object should the graphical object overlay a part of the previous contents of the display area.

12. The method according to claim 1, wherein the functional, organizational and/or chronological sequence of a manufacturing or work process is represented.

13. The method according to claim 1, wherein the graphical object shows the object in another view compared to the display area and/or shows a detail of the object.

14. The method according to claim 1, wherein the graphical object shows a part of the overall process presented in the display area and wherein the graphical object shows technical information stored for this part if necessary.

15. The method according to claim 1, wherein the screen is a computer screen.

16. The method according to claim 1, wherein the method is executed by a computer program product loaded into the memory of a computer and comprising software code to perform the method steps.

17. A system for generating a graphical presentation of a three-dimensional physical object and/or a technical process on a screen, wherein an image of the object and/or the process are presented on a display area of the screen, the system comprising: a processor responsive to computer-readable media having stored thereon instructions that, when executed by the processor, cause the processor to:

generate at least one element on the display area, wherein the element is activated by an input device, said at least one element being associated with the following: a view of a portion of the graphical presentation of the object, a first two-dimensional visualization view of the three-dimensional object along a first spatial direction, and a flow diagram of the technical process; and add a graphical object to be displayed on the display area upon an activation of the element, wherein the graphical object displays the following proximate the element: an augmented graphical view of the portion of the object, a second two-dimensional visualization view of the three-dimensional physical object, wherein the second visualization corresponds to a predefined rotation of the three-dimensional object relative to the first visualization view of the object, wherein the second visualization of the three-dimensional object is along a second spatial direction perpendicular to the first spatial direction, and one or more actions in connection with the flow diagram of the technical process, wherein the adding of the graphical object to the display area is performed such that with the positioning of the graphical object within the display area its previous contents is shifted downwards as from the required position of the graphical object should the graphical object overlay a part of the previous contents of the display area.

* * * * *